# United States Patent [19]

Suh et al.

[11] 4,312,910

[45] Jan. 26, 1982

[54] STYRENE-ACRYLIC ACID COPOLYMER FOAM

[75] Inventors: Kyung W. Suh, Granville, Ohio; Jonathan R. Jones, Mystic, Conn.

[73] Assignee: The Dow Chemical Company, Midland, Mich.

[21] Appl. No.: 137,230

[22] Filed: Apr. 4, 1980

[51] Int. Cl.³ .............................................. B32B 7/02
[52] U.S. Cl. ................................... 428/220; 521/79; 521/147
[58] Field of Search ................... 521/79, 147; 428/220

[56] References Cited

U.S. PATENT DOCUMENTS

| | | | |
|---|---|---|---|
| 2,911,382 | 11/1959 | Barkhuff, Jr. et al. | 521/94 |
| 2,962,456 | 11/1960 | Carlson, Jr. | 521/147 |
| 3,072,581 | 1/1963 | Platzer | 521/139 |
| 3,676,378 | 7/1972 | Heil et al. | 521/147 |

*Primary Examiner*—Morton Foelak
*Attorney, Agent, or Firm*—R. B. Ingraham

[57] ABSTRACT

Machinable foams having improved solvent resistance are prepared from a styrene-acrylic acid copolymer.

6 Claims, No Drawings

STYRENE-ACRYLIC ACID COPOLYMER FOAM

Extruded polystyrene foams are well known items of commerce and are employed primarily as thermal insulation. However, other extruded polystyrene foams are employed for a variety of other end use applications. By the term "extruded foam" is meant a body of generally uniform cellular construction which does not exhibit sharp discontinuities in cell size across a section taken therefrom which is in sharp contrast to the so-called bead foams prepared by molding a plurality of expandable or partially expanded cellular styrene polymer particles. Extruded polystyrene foam has considerable application in the decorative area wherein sometimes it is cut to a desired shape and the shape employed as a decoration or part of a decorative display. Sometimes a foam is sculptured to various configurations which may then be painted or otherwise coated to form a decorative article. Cutting and shaping of such extruded foam is accomplished in a number of ways. One convenient means for cutting shapes from a plank or rectangular foam body is using a hot wire cutter. A wire having a substantial electrical resistance when hot, such as Nichrome wire, is heated by means of appropriate electrical current and is employed to melt its way through a foam body very much in the manner that one might employ a jig or saber saw. Saws, knives, routers and abrasives also may be used to shape extruded foam. Desirably, in the fabrication of shaped articles from extruded foam, cutting or shaping operations should be accomplished as quickly as possible. As polystyrene is a thermoplastic, some care must be taken in the selection of the cutting tools and in the variety of foam employed. There has been developed a machinability test for the evaluation of the machinability of plastic foams, and more particularly of extruded polystyrene foam. In such testing a router bit is employed; the bit has a blade of flat steel measuring 2 inches by 3-3/32 inches. On the center of one of the longer edges is affixed a cylindrical shank having its axis in the plane of the blade. The opposite edge has a 1½ inch radius semi-circle cut therefrom which results in a tool which when rotated by means of the shank and forced into a piece of foam will leave a 3-inch diameter hemisphere projecting therefrom. The router bit is rotated at 4,250 revolutions per minute and the desired cut is made with a single smooth stroke beneficially employing a drill press. The time required to make a cut having a smooth surface, that is, without blemishes or tearing of the foam is noted. The more desirable foams permit making a smooth surfaced cut in about one second, whereas the less desirable foams require longer periods of time to accomplish the cut. For polystyrene foams having good machinability in the density range of about 2 pounds per cubic foot, most have a cell size in the range of from about 1.4 to 5 millimeters. Oftentimes although they may be machined rapidly, the size of the cells results in an undesirably rough exterior and in some cases, an appearance which is not aesthetically appealing. Such foamed articles oftentimes are employed for floral arrangements wherein a significant portion of their desirability is the ease with which a plant stem may be manually inserted into a block of foam without prior preparation. Such ease of plant stem insertion generally corresponds to the machinability of the foam. The easier the foam is to machine, the easier it is to push the end of a flower stem therein and the plant be supported in a desired position by the foam. In the cutting of polystyrene foam with hot wire technique, oftentimes an undesirable or distorted configuration occurs where the operator pauses and changes the direction of the cut. If the wire is operating at a commercially desirable temperature, that is a temperature at which cuts can be quickly and easily made, the phenomenon of "melt back" is observed. As the wire is passed through the foam at a normal or relatively high cutting speed, the kerf is about the width of the wire. However, if the operator pauses or substantially slows the cutting speed, the radiant heat from the wire can be sufficient to melt the foam or at least cause the foam to collapse and provide a kerf which is substantially wider than the wire. A convenient form for the handling of extruded foam is often in the form of boards which are prepared from large extruded foam bodies by conventional wood-working techniques, that is sawing and planing. Therefore, machinability for certain applications is a highly desired characteristic.

It would be desirable if there were available an improved synthetic resinous thermoplastic extruded foam which exhibited a high degree of machinability.

It would also be desirable if there were available a synthetic resinous thermoplastic extruded foam which exhibited a reduced tendency to melt back when cut with a hot wire.

It would also be desirable if there were available an improved synthetic resinous thermoplastic extruded foam which could be prepared using a volatile fluid foaming agent of minimal toxicity and environmental impact.

It would also be desirable if there were available an improved synthetic resinous thermoplastic extruded foam having good machinability and increased resistance to solvents.

These benefits and other advantages are achieved in a synthetic resinous thermoplastic extruded foam having a direction of extrusion and an axis of extrusion, the foam having a plurality of generally closed cells containing gas, the foam having a cross sectional configuration taken in a plane normal to the axis of extrusion of at least 8 square inches and a minimum dimension of at least 0.7 inch, the foam comprising a copolymer of from about 99.5 parts by weight of styrene to about 70 parts by weight styrene copolymerized therein from about 0.5 to about 30 parts by weight of acrylic acid.

The preparation of styrene and acrylic acid copolymer is well known and is disclosed in U.S. Pat. No. 3,035,033, the teaching of which is herewith incorporated by reference thereto. Foams in accordance with the present invention can be readily prepared employing styrene-acrylic acid copolymer having a molecular weight as determined by gel permeation chromatography of from 100,000 to 350,000 gram moles. However, it is preferred to employ such copolymers having weight average molecular weight of from about 150,000 gram moles to about 300,000 gram moles. The amount of acrylic acid utilized may be from 0.5 to about 30 parts by weight with 99.5 to about 70 parts by weight of styrene. A particularly desirable range is from about 1 to about 20 parts by weight acrylic acid and from about 99 to about 80 parts by weight styrene. A preferred range is from about 5 to about 20 parts by weight of acrylic acid and from about 95 to about 80 parts by weight of sytrene. Extruded foams in accordance with the present invention have a density of from about 1.2 to 5 pounds per cubic foot. The cell size of the foam in accordance with the present invention is from about 0.5 to 3 millimeters and advantageously from about 0.6 to 2 millimeters as determined in accordance with the American Society for Testing Materials standard D 3576. Foam in accordance with the present invention is advantageously prepared by providing heat plastified resin as hereinbefore described, admixing the heat plastified resin with a suitable volatile fluid foaming agent, for example ethyl chloride, the heat plastified resin-fluid foaming agent mixture being maintained under a pressure sufficient to prevent foaming thereof and subsequently discharging a foamable gel of the heat plastified resin and foaming agent into a region of lower pressure, such as atmospheric pressure to cause the gel to foam and cool in a self-supporting condition. Generally the volatile fluid foaming agent is employed in quantity of foam about 1.2 to about 2.3 moles per kilogram of resin. Generally the gel and blowing agent are admixed mechanically at a temperature of from about 180° C. to about 220° C., the temperature of the gel on extrusion is usually from about 122° C. to about 148° C. Advantageously in such mixing, the fluid foaming agent is injected into the barrel and the extruder by means of a metering pump to provide the desired mixture of resinous component and foaming agent. Extrusion of plastic foams is well known and is set forth in the following U.S. Pat. Nos.: 2,669,751; 2,740,157; 2,838,801; 3,751,377; 3,817,669; 3,954,929; 3,897,528; 3,914,085; the teachings of which are herewith incorporated by reference thereto.

A plurality of foams were prepared employing a copolymer of about 92 parts by weight of styrene and 8 parts by weight of acrylic acid having a weight average molecular weight of 196,000 gram moles as determined by gel permeation chromatography. The polymer was in the form of pellets or granules. The polymer was extruded using a 2½-inch extruder wherein about 12 parts by weight of ethyl chloride was added per 100 parts by weight of the copolymer. The extruder barrel temperature was 217° C.; the temperature of the resultant extruded gel was 109°-125° C. to prepare foams of varying cell size and density. In each case a generally uniform foam was obtained which on expansion had a cross section dimension of about 2 inches by 8 inches. On cooling to room temperature, the foam was sectioned and the cell size in vertical direction determined, the vertical direction being the thickness of the extruded foam plank. Samples were aged for various periods of time and the machinability tested in the hereinbefore described manner. For purposes of comparison, a plurality of polystyrene foam samples of varying density and cell size were evaluated for machinability in the hereinbefore described manner. Both styrene acrylic acid foams and polystyrene foams were aged for a sufficient length of time but most of blowing agent employed for the manufacture of the foams had been replaced by air. The results are set forth in Table I wherein the abbreviation SAA indicates styrene acrylic acid; the abbreviation PS indicates polystyrene; PCF indicates pounds per cubic foot; SEC. indicates seconds; and MM indicates millimeters.

TABLE I

| SAA MACHINABILITY VS. PS | | | | |
|---|---|---|---|---|
| PS | | | SAA | |
| DENSITY PCF | MACHINING TIME (SEC.) | SIZE (MM) | MACHINING TIME (SEC.) | DENSITY (PCF) |
| 1.73 | 2 | 1.9 | 1–2 | 1.97 |
| 1.59 | 2 | 1.4 | 1 | 1.74 |
| 1.71 | 3 | 1.2 | 1 | 1.79 |
| | | .9 | 2 | 2.00 |
| 1.68 | 3 | .8 | 3 | 1.95 |
| 1.68 | 4 | .75 | 3–4 | 1.92 |
| | 4 | .6 | 4 | 1.87 |
| | | .5 | 3–4 | 2.08 |
| 2.18 | 4 | .4 | | |

From Table I, can readily be seen that samples employing styrene-acrylic acid copolymer have substantially improved machinability over the samples utilizing polystyrene. It was observed that each of the polystyrene samples exhibited some tearing and rough surface, whereas the samples employing styrene-acrylic acid copolymer showed no tearing. Foams of samples were evaluated for solvent resistance. Samples of styrene-acrylic acid foam showed no effect from normal pentane, normal heptane, cyclohexane, normal pentanol or normal butanol. Polystyrene foam was severely attacked by both normal pentane and normal heptane, and dissolved in cyclohexane.

Styrene acrylic acid foam and polystyrene foam were evaluated for hot wire cutting by three different tests. In the first test a nichrome wire 0.020 inches in diameter is connected to an electrical power source and heated to obtain a bright red glow. Samples were manually pushed against the wire and a vertical cut of about 1 inch made in the sample. The sample remained at rest for a period of time set forth in Table II as "Time at Rest," moved about 1 inch further, stopped again for a period of time. When the foam sample stopped relative to the wire, some melt back of the foam occurred and an enlarged hole in the foam obtained. The diameter of the hole is reported in Table II as "Hole Diameter for Measured Time at Rest."

A second test with the same wire was employed wherein a rectangular piece was cut from one edge of the foam sample. The cutting was accomplished at the rate of 1 inch per second. When the cutting was completed, the piece was then placed back in the sample and the total gap measured, divided by 2 and is reported as gap width at 1 inch per second cutting rate.

A third test was performed by providing an inclined plane having a nichrome wire horizontally disposed and generally parallel to the surface. A 4 inch by 4 inch foam sample was placed on the inclined plane above and resting on the nichrome wire, a weight placed on the foam sample, electrical power was applied to the nichrome wire and the time required to cut through the 4 inch by 4 inch sample recorded and is reported in Table II as "Cutting Time" for the 4 inch by 4 inch cross section.

In addition, styrene acrylic acid polymer foams are more resistant to solvents than are foams of polystyrene.

TABLE II

| | | CUTTING SAA BY HOT WIRE VS. PS | | | | | |
|---|---|---|---|---|---|---|---|
| | | HOLE DIAMETER FOR MEASURED "TIME AT REST" | | | | GAP WIDTH (at 1"/Sec. | CUTTING TIME (4" × 4" |
| Sample | Density | 2 SEC. | 3 SEC. | 4 SEC. | 5 SEC. | Cutting Rate) | Cross-Section) |
| SAA | 2.22 | 2.0 mm | 2.5 mm | 3.5 mm | 5.0 mm | .6 mm | 13 SEC. |
| PS | 2.26 | 2.5 mm | 3.0 mm | 5.0 mm | 5.5 mm | 1.0 mm | 13 SEC. |

It was observed that each of the polystyrene samples exhibited some tearing and rough surface, whereas the samples employing styrene-acrylic acid copolymer showed no tearing.

In a manner similar to the foregoing illustrations, other styrene-acrylic acid copolymers which are readily machined are prepared. Among the many usable blowing agents for the preparation of styrene-acrylic acid copolymer are ethyl chloride, methyl chloride, mixtures of dichlorofluoromethane, dichlorodifluoromethane, normal pentane with dichlorodifluoromethane, ethyl chloride with dichlorodifluoromethane, methyl chloride with dichlorodifluoromethane, methylchloride with 1-chloro-1,1-difluoroethane, ethylchloride with 1-chloro-1,1-difluoroethane, carbon dioxide and dichlorodifluoromethane, carbon dioxide and 1-chloro-1,1-difluoroethane, carbon dioxide and trichlorofluoromethane, carbon dioxide and methyl chloride. Carbon dioxide and ethyl chloride are exemplary of mixed blowing agents suitable for the preparation of foams in accordance with the present invention. Generally such mixtures contain 30–70 parts by weight of the first component and 70–30 parts by weight of the second component, such as trichlorofluoromethane and dichlorofluoromethane; normal pentane and dichlorodifluoromethane; ethyl chloride and dichlorodifluoromethane; methyl chloride and difluoromethane; methyl chloride and 1-chloro-1,1-difluoroethane; ethyl chloride and 1-chloro-1,1-difluoroethane; carbon dioxide and dichlorodifluoromethane; carbon dioxide and 1-chloro-1,1-difluoroethane; carbon dioxide and trichlorofluoromethane; carbon dioxide and methyl chloride; carbon dioxide and ethyl chloride.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A synthetic resinous thermoplastic extruded foam having a direction of extrusion and an axis of extrusion, the foam having a plurality of generally closed cells containing gas, the foam having a cross sectional configuration taken in a plane normal to the axis of extrusion of at least 8 square inches and a minimum dimension of at least 0.7 inch, the foam comprising a copolymer of from about 99.5 parts by weight of styrene to about 70 parts by weight styrene copolymerized therein from about 0.5 to about 30 parts by weight of acrylic acid, the molecular weight of the styrene-acrylic acid copolymer is from about 100,000 to about 350,000 gram moles.

2. The foam of claim 1 wherein the copolymer contains from about 1 to 20 parts by weight acrylic acid and from about 99 to 80 parts by weight styrene.

3. The foam of claim 2 wherein the copolymer contains from about 5 to 20 parts by weight acrylic acid and from about 95 to 80 parts by weight of polystyrene.

4. The foam of claim 1 having a density of about 1.2 to 5 pounds per cubic foot.

5. The foam of claim 1 having an average cell size within the range of 0.5 to about 3 millimeters.

6. A synthetic resinous thermoplastic extruded foam having a direction of extrusion and an axis of extrusion, the foam having a plurality of generally closed cells containing gas, the foam having a cross sectional configuration taken in a plane normal to the axis of extrusion of at least 8 square inches and a minimum dimension of at least 0.7 inch, the foam comprising a copolymer of from about 99.5 parts by weight of styrene to about 70 parts by weight styrene copolymerized therein from about 0.5 to about 30 parts by weight of acrylic acid, the molecular weight of the styrene-acrylic acid copolymer is from about 100,000 to about 300,000 gram moles, the foam having a density of from about 1.2 to 5 pounds per cubic foot and an average cell size within the range of 0.5 to about 3 millimeters.

* * * * *